(12) United States Patent
Hao et al.

(10) Patent No.: US 8,250,520 B2
(45) Date of Patent: Aug. 21, 2012

(54) IMPLEMENTING CUSTOM ACTIVITIES IN A WORKFLOW

(75) Inventors: Eilene Hao, Bellevue, WA (US);
Alexander Malck, Seattle, WA (US);
William J. Griffin, Sammamish, WA (US); Richard E. Andeen, Kirkland, WA (US); Phillip D. Allen, Kirkland, WA (US); Gabriel J. Hall, Woodinville, WA (US); Jeremy Michael Ehrhardt, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 806 days.

(21) Appl. No.: 12/405,961

(22) Filed: Mar. 17, 2009

(65) Prior Publication Data

US 2010/0242013 A1 Sep. 23, 2010

(51) Int. Cl.
*G06Q 10/00* (2012.01)
*G06F 9/44* (2006.01)

(52) U.S. Cl. ........ 717/102; 717/101; 705/301; 705/7.27

(58) Field of Classification Search ........................ None
See application file for complete search history.

(56) References Cited

U.S. PATENT DOCUMENTS

| | | | |
|---|---|---|---|
| 7,065,493 B1 * | 6/2006 | Homsi ........................ 705/7.27 |
| 7,069,536 B2 * | 6/2006 | Yaung ........................ 717/102 |
| 7,069,541 B2 | 6/2006 | Dougherty | |
| 7,350,188 B2 * | 3/2008 | Schulz ........................ 717/102 |
| 7,406,424 B2 * | 7/2008 | Cheeniyil et al. ............ 705/301 |
| 7,409,671 B1 * | 8/2008 | Meredith et al. ............. 717/102 |
| 7,467,371 B1 * | 12/2008 | Meredith et al. ............. 717/102 |
| 7,653,562 B2 * | 1/2010 | Schulz et al. ................ 705/301 |
| 7,680,683 B2 * | 3/2010 | Hilerio et al. ................ 705/7.27 |
| 2002/0078432 A1 * | 6/2002 | Charisius et al. ............ 717/102 |
| 2004/0187089 A1 * | 9/2004 | Schulz .......................... 717/101 |
| 2006/0048099 A1 | 3/2006 | Templin | |
| 2007/0174810 A1 * | 7/2007 | Hockenberry et al. ....... 717/101 |
| 2007/0226680 A1 * | 9/2007 | Kumhyr et al. .............. 717/102 |
| 2008/0034347 A1 * | 2/2008 | V et al. ....................... 717/101 |
| 2009/0006154 A1 | 1/2009 | Hao | |

OTHER PUBLICATIONS

Irma Becerra et al., An Infrastructure for Managing Knowledge using Intelligent Workflow, 2001, [Retrieved on Apr. 25, 2012]. Retrieved from the internet: <URL: http://www.aaai.org/Papers/FLAIRS/2001/FLAIRS01-053.pdf> 5 Pages (275-279).*

(Continued)

*Primary Examiner* — Don Wong
*Assistant Examiner* — Anibal Rivera
(74) *Attorney, Agent, or Firm* — Merchant & Gould

(57) ABSTRACT

A front-end computing system initializes an instance of a workflow. The workflow contains a plurality of activities. The plurality of activities includes a shim activity. When the front-end computing system executes the workflow instance, the front-end computing system performs the shim activity. When the front-end computing system performs the shim activity, the front-end computing system sends a custom activity assembly to a sandbox computing system. The custom activity assembly is not fully trusted. The sandbox computing system executes the custom activity assembly. The sandbox computing system is isolated from the front-end computing system such that unexpected behavior of the sandbox computing system does not cause the front-end computing system to perform unexpected behavior.

20 Claims, 10 Drawing Sheets

OTHER PUBLICATIONS

Kaizar Amin et al., GridAnt: A Client-Controllable Grid Workflow System, 2004, [Retrieved on Apr. 25, 2012]. Retrieved from the Internet: <URL: http://ieeexplore.ieee.org/stamp/stamp.jsp?tp=&arnumber=1265491> 10 Pages (1-10).*

Soren Peter Nielsen et al., Using Domino Workflow, May 2000, [Retrieved on Apr. 25, 2012]. Retrieved from the internet: <URL: http://gcc.upb.de/www/wi/wi2/wi2_lit.nsf/7544f3043ee53927c12573e70058bbb6/a1ac9e4b01ebed26c1256c48002b08bd/$FILE/Using%20Domino%20Workflow.pdf> 336 Pages (1-319).*

"Creating Declarative, No-Code Workflow Editors," msdn™, © 2009, pp. 1-2.

"Design Custom Workflows by using SharePoint Designer," Microsoft™ Office Online, 2007, pp. 1-4.

"Workflow Development in Office SharePoint Designer," msdn™, © 2009, pp. 1-2.

Baron, Andy, "Integrating Workflows into Access 2007 Applications," msdn™, MCW Technologies, © 2009, pp. 1-31.

Keller, Alexander, "Automating the Provisioning of Application Services with the BPEL4WS Workflow Language," May 24, 2004, pp. 1-12.

* cited by examiner

IMPLEMENTING CUSTOM ACTIVITIES IN A WORKFLOW

BACKGROUND

A business process is a set of tasks performed by an enterprise to provide a service. In many instances, the performance of business processes constitutes the routine operation of an enterprise. For example, an enterprise may perform a business process in which employees of the enterprise submit reimbursement requests for travel expenses. In this example, a supervisor reviews each reimbursement request. If, in this example, the supervisor approves a reimbursement request, an accounts payable department of the enterprise writes a check to the employee. If, in this example, the supervisor disapproves a reimbursement request, an email message is sent to the employee notifying the employee that the reimbursement request was denied.

Workflows are computerized implementations of business processes. A workflow comprises a set of activities. Each activity in a workflow corresponds to a task in a business process. Each activity in a workflow is associated with computer-executable code that implements the activity. When a computer executes an instance of a workflow, the computer executes the computer-executable code implementing activities in the workflow.

When a computer executes code implementing an activity in a workflow, the code could cause the computer to perform unexpected behavior. For instance, if the code implementing an activity contains a computer virus, executing the code could cause the computer to transmit personal information. In another instance, if the code implementing an activity is poorly written, executing the code could cause the computer to crash. In many circumstances, instances of workflows are executed at a server system that provides services vital to the mission of an enterprise. Accordingly, it is unacceptable for the server system to perform unexpected behavior.

SUMMARY

A front-end computing system initializes an instance of a workflow. The workflow contains a plurality of activities. The plurality of activities includes a shim activity. When the front-end computing system executes the workflow instance, the front-end computing system performs the shim activity. When the front-end computing system performs the shim activity, the front-end computing system sends a custom activity assembly to a sandbox computing system. The custom activity assembly is not fully trusted. The sandbox computing system executes the custom activity assembly. The sandbox computing system is isolated from the front-end computing system such that unexpected behavior of the sandbox computing system does not cause the front-end computing system to perform unexpected behavior.

This summary is provided to introduce a selection of concepts in a simplified form. These concepts are further described below in the Detailed Description. This summary is not intended to identify key features or essential features of the claimed subject matter, nor is this summary intended as an aid in determining the scope of the claimed subject matter.

DETAILED DESCRIPTION

As briefly described above, a front-end computing system uses shim activity assemblies to send partially-trusted custom activity assemblies to a sandbox computing system for execution. The technologies of this disclosure are explained with reference to the attached figures. It should be appreciated that the figures are provided as examples.

Figure 1:
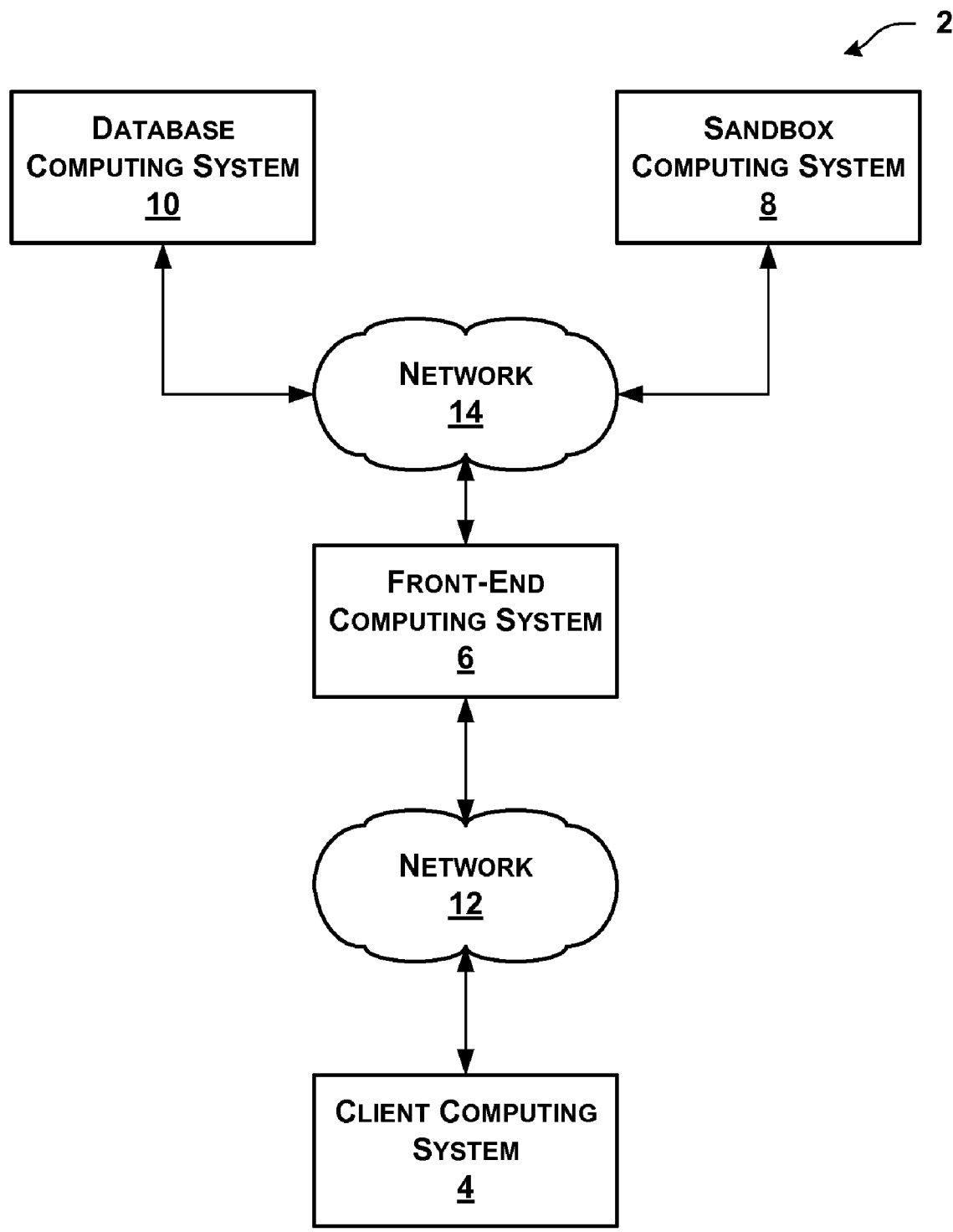
FIG. 1 is a block diagram illustrating an example system.

FIG. 1 is a block diagram illustrating an example system 2. It is to be understood that system 2 is merely one example. The techniques of this disclosure may be implemented in many other ways. For instance, other systems implementing the techniques of this disclosure may include more or fewer components, systems, connections, and so on.

As illustrated in the example of FIG. 1, system 2 includes a client computing system 4. Client computing system 4 is an electronic computing system. As used in this disclosure, an electronic computing system is a set of one or more electronic computing devices. This disclosure describes details of an example electronic computing device with reference to FIG. 10. Client computing system 4 may include a wide variety of different types of electronic computing devices. For example, client computing system 4 may include a personal computer, a mobile telephone, a personal digital assistant (PDA), a digital media player, a television set top box, a television, a home appliance, an industrial appliance, a device integrated into a vehicle, a video game console, an Internet kiosk, a netbook, a laptop computer, a handheld video game device, an intermediate network device, a standalone server device, a server blade device, a network storage device, an Automated Teller Machine, a wearable computing device or another type of electronic computing device.

In addition to client computing system 4, system 2 includes a front-end computing system 6, a sandbox computing system 8 and a database computing system 10. Front-end computing system 6, sandbox computing system 8 and database computing system 10 are electronic computing systems. Like client computing system 4, front-end computing system 6, sandbox computing system 8 and database computing system 10 may include a wide variety of different types of electronic computing devices. For instance, front-end computing system 6, sandbox computing system 8, and/or database computing system 10 may include any of the types of electronic computing devices described above.

System 2 also includes a network 12 and a network 14. Network 12 and network 14 are electronic communication networks. Network 12 facilitates electronic communication between client computing system 4 and front-end computing system 6. Network 14 facilitates communication between front-end computing system 6, sandbox computing system 8 and database computing system 10. Network 12 and network 14 may be implemented in a variety of ways. For example, network 12 and/or network 14 may be wide-area networks, such as the Internet. In other examples, network 12 and/or network 14 may be local-area networks, metropolitan-area networks, or other types of electronic communication networks. Network 12 and/or network 14 may include wired and/or wireless data links. A variety of communications protocols may be used in network 12 and network 14. Such communications protocols include, but are not limited to, Ethernet, Transmission Control Protocol (TCP), Internet Protocol (IP), Hypertext Transfer Protocol (HTTP), SOAP, remote procedure call (RPC) protocols, user datagram protocol (UDP), IPSec, Resource Reservation Protocol (RSVP), Internet Control Message Protocol (ICMP) and/or other types of communications protocols.

In the example of FIG. 1, an application operating on client computing system 4 communicates with front-end computing system 6 to request a service provided by a server application operating on front-end computing system 6. In a first example, a web browser application may operate on client computing system 4 and a web server application may operate on front-end computing system 6. In this first example, the web browser application may be a version of INTERNET EXPLORER® internet browser manufactured by Microsoft Corporation and the web server application may be an Internet Information Services web server application manufactured by Microsoft Corporation. Furthermore, in this first example, the web browser application may request a web page hosted by the web server application by sending a HTTP request to the web server application via network 12. In a second example, an e-mail client application may operate on client computing system 4 and an e-mail server application may operate on front-end computing system 6. In this second example, the e-mail client application may be the OUTLOOK® messaging and collaboration client manufactured by Microsoft Corporation and the e-mail server application may be the Exchange messaging server application manufactured by Microsoft Corporation. Furthermore, in this second example, the e-mail client application may request e-mail messages stored by the e-mail server application.

As described in greater detail below with regard to FIGS. 3-6, a server application operating at front-end computing system 6 uses a host application operating at front-end computing system 6 to respond to some or all requests received by the server application. For example, the host application may be an ASP.NET application and the server application may a web server application. In this example, the web server application may use the ASP.NET application to respond to HTTP requests for resources having .aspx filename extensions.

In the example of FIG. 1, the host application uses workflows to process requests from the server application. As used in this disclosure, a workflow is a computerized implementation of a business process. A business process is a collection of related, structured tasks that an enterprise performs to provide a specific service. An example workflow is described below with reference to FIG. 2. It should be appreciated that in other example scenarios, a host application operating at an electronic computing system may use a workflow without first receiving a request from any other application.

A workflow comprises a plurality of discrete activities. Each activity in the workflow is associated with an activity assembly. An activity assembly is a set of computer-executable instructions implementing an activity. To use a workflow, the host application first instantiates the workflow. When the host application instantiates the workflow, a runtime environment instantiates the activity assemblies associated with each of the activities in the workflow. As used in this disclosure, an activity object is an instance of an activity assembly.

As explained below with reference to FIG. 9, a user can design a workflow using a workflow design application. In one example, the workflow design application may present a user interface that enables the user to drag and drop representations of available activities into a canvas area. The available activities are activities that are available to be included in a workflow. The user may then connect the activities in the canvas area into a workflow by binding properties of activities in the canvas area to properties of other activities in the canvas area. In this way, the designer-user is able to design a workflow without drafting code that implements the entire workflow. Designing a workflow in this manner may be more efficient than drafting code implementing the workflow from scratch.

In another example, the workflow design application may be a declarative workflow design application. A declarative workflow design application is an application that enables a user to design a workflow or a workflow template using natural language sentences that express business process tasks performed by activities. For example, a declarative workflow design application may display the following sentence: "Send an email message to _____." In this example, the sentence expresses the task of sending an e-mail message. A specific activity implements this task, but the user does not need to know how anything about how the specific activity is added to the workflow or how the specific activity operates. In other words, implementation details of the activity are hidden from the user. In this example, the natural language sentence includes a data input field represented by the underscored blank. In this example, the user can insert an e-mail address in the underscored blank. Furthermore, in this example, the user can insert a variable name in the underscored blank, thereby leaving the input property associated with the underscored blank to be provided by a workflow customization table when the workflow is instantiated The available activities may include activities associated with fully-trusted activity assemblies. The fully-trusted activity assemblies have been thoroughly tested to ensure that execution of activity objects instantiating the fully-trusted activity assemblies by an electronic computing system does not cause the electronic computing system to perform unexpected behavior. For example, the fully-trusted activity assemblies may be tested to ensure that execution of the fully-trusted activity assemblies does not cause electronic computing systems to crash due to programming errors. In another example, the fully-trusted activity assemblies may be trusted not to cause electronic computing systems to perform malicious behavior. In other words, the fully-trusted activity assemblies may be trusted not to contain computer viruses. The workflow design application may ship with fully-trusted activity assemblies associated with commonly-used activities.

In some circumstances, the workflow design application does not ship with fully-trusted activity assemblies associated with an activity that a user needs to design a workflow implementing a particular business process. In other words, the user needs to design a workflow that includes a custom activity. For example, a business process may include a task that requires the automatic generation of a pie chart. In this example, the workflow design application may not ship with a fully-trusted activity assembly associated with an activity for automatically generating pie charts. In such circumstances, a user may draft a custom activity assembly associated with the custom activity. For example, the user may draft computer-executable instructions that, when executed by a computer, cause the computer automatically generate a pie chart.

After the user drafts the custom activity assembly and installs the custom activity assembly, the workflow design application includes the custom activity in the available activities so that the custom activity is available for inclusion in workflows. For example, the workflow design application user may enable the user to drag and drop a representation of the custom activity into a canvas area with other activities. In this example, the user may bind properties of the custom activity assembly to properties of other activities and connect properties of the custom activity to input properties of other activities, thereby integrating the custom activity into a workflow much like the user would integrate any other activity into the workflow. In a second example, the custom activity may be associated with a natural language sentence describing a business task implemented by the custom activity. The natural language sentence associated with custom activity may include one or more data input fields. In this second example, a declarative workflow design application enables a user to select available activities from a displayed list of activity titles. When the user selects an activity title from the list, the declarative workflow design application displays the natural language sentence associated with the activity and enables the user to fill in data input fields in the natural language sentence. In this way, the declarative workflow design application enables the user to create a workflow without knowing implementation details of the activities. Furthermore, in this second example, the declarative workflow design application may not provide to the user any apparent indication whether a selected activity is implemented by a custom activity assembly or a fully-trusted activity assembly.

Custom activity assemblies may not be subject to the rigorous testing performed on fully-trusted activity assemblies. Consequently, it is more likely that a custom activity assembly could cause front-end computing system 6 to perform unexpected behavior than it is for a fully-trusted activity assembly. For example, it is more likely that a custom activity assembly will cause an electronic computing system to crash than a fully-trusted activity assembly. Therefore, it may not be desirable to use custom activity assemblies at front-end computing system 6.

Sandbox computing system 8 is configured to execute custom activity objects. Sandbox computing system 8 is isolated from front-end computing system 6 such that performance of unexpected behavior by sandbox computing system 8 does not cause unexpected behavior by front-end computing system 6. For example, sandbox computing system 8 may not share a common memory module with front-end computing system 6. In another example, front-end computing system 6 may only accept particular types of communication from sandbox computing system 8. In this way, poorly drafted or malicious code in a custom activity assembly does not disable front-end computing system 6 or otherwise cause front-end computing system 6 to perform unexpected behavior.

As described in detail below, when the user attempts to add a custom activity to a workflow and that custom activity is associated with a partially-trusted activity assembly, the workflow design application automatically adds a shim activity to the workflow in place of the custom activity. The shim activity is associated with a fully-trusted activity assembly. The shim activity assembly accepts a parameter specifying the custom activity assembly. Because the shim activity assembly is fully-trusted, the shim activity assembly is permitted to execute a front-end computing system 6.

When front-end computing system 6 initiates execution of the shim activity assembly, the shim activity assembly automatically causes front-end computing system 6 to send the specified custom activity assembly to sandbox computing system 8. Sandbox computing system 8 is configured to automatically execute a custom activity object instantiating the custom activity assembly. After sandbox computing system 8 executes the custom activity object, front-end computing system 6 receives a modified workflow context object. The modified workflow context object has a set of properties. The values of the properties of the modified workflow context are equivalent to values of properties of the custom activity object after execution of the custom activity object. For example, if the custom activity object generated a digital image of a pie chart, the digital image may be assigned to a property of the custom activity object. Consequently, in this example, the digital image may be assigned to a property of the modified workflow context object.

After receiving the modified workflow context object, the shim activity object updates properties of the shim activity object based on the values of the properties of the modified workflow object. For example, if a digital image is assigned to a property of the modified workflow object, the shim activity object updates a property of the shim activity object such that the digital image is assigned to the property of the shim activity object. Front-end computing system 6 may then complete performance of the shim activity assembly. In this way, it is transparent to other activity objects in the workflow that the values of the properties of the shim activity object were actually generated by a custom activity object at sandbox computing system 8.

In the example of FIG. 1, database computing system 10 stores a variety of data. In one example implementation, database computing system 10 stores solution files. A solution file contains each file needed to deploy one or more workflows. In one example implementation, a solution file is a cabinet file containing compiled workflow files, each associated with a workflow. In one example implementation, the compiled workflow files may be dynamic linking libraries (DLLs). Execution by a properly configured electronic computing system of a compiled workflow file in the solution file causes the electronic computing system to perform a workflow. The solution file may also contain custom activity assemblies needed to execute the workflows. In this example, when front-end computing system 6 initializes a workflow, front-end computing system 6 retrieves a solution file from database computing system 10 and uses a compiled workflow file in the solution file to initialize the workflow. In some example implementations, front-end computing system 6 may locally cache workflow files and/or workflow assemblies. In one example implementation, database computing system 10 also stores application data. For example, database computing system 10 may store a list of employees.

Database computing system 10 may be implemented in a variety of ways. For example, database computing system 10 may be implemented as a SQL database system.

It should be appreciated that system 2 may be implemented in a wide variety of ways. In one example, system 2 may not include client computing system 4. In this example, front-end computing system 6 may execute instances of workflows in response to commands received from a user directly using front-end computing system 6. In another example, front-end computing system 6 and database computing system 10 may be integrated into the same electronic computing device. In another example, the content of database computing system 10 may be distributed among a plurality of database system. Furthermore, system 2 may include a plurality of front-end systems and/or sandbox systems.

Figure 2:
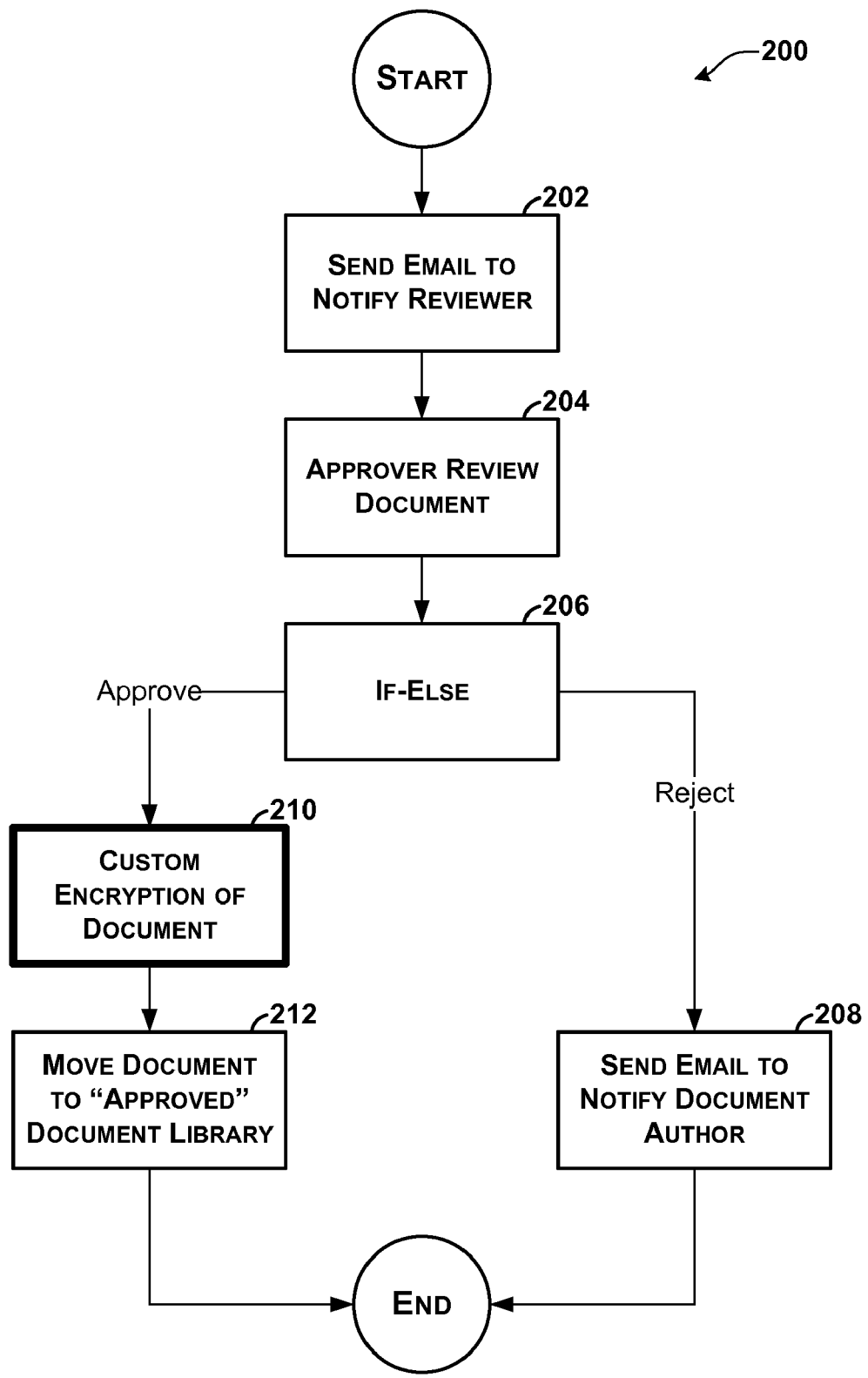
FIG. 2 is a block diagram illustrating an example workflow.

FIG. 2 is a block diagram illustrating an example workflow 200. It should be appreciated that workflow 200 is provided for purposes of explanation only. Workflow 200 is not intended to be interpreted as a sole workflow that can be used in system 2.

In the example of FIG. 2, workflow 200 implements a business process for approving a document. At activity 202, an e-mail is sent to a reviewer notifying the reviewer that an author has added a document to an "unapproved" document library. Next, at activity 204, an approver reviews the document. At activity 206, it is automatically determined whether the approver approved the document or rejected the document. If the approver rejected the document, an e-mail is sent to the author at activity 208, the email notifying the author that the approver rejected document. If the approver approved the document, a custom encryption operation is performed on the document at activity 210. After the custom encryption operation is performed on the document, the document is moved to an approved document library at activity 212. After activity 208 or activity 212, workflow 200 ends.

In the example of FIG. 2, activities 202, 204, 206, 208 and 212 are implemented by discrete fully-trusted activity assemblies and activity 210 associated with a partially-trusted custom activity assembly. To ensure sandbox computing system 8 executes the custom activity assembly implementing activity 210, front-end computing system 6 executes a shim activity object instead of executing a custom activity object instantiating the partially-trusted custom activity assembly. The shim activity object is an instance of a fully-trusted activity assembly. Execution of the shim activity object causes front-end computing system 6 to send the custom activity assembly to sandbox computing system 8 for instantiation and execution.

Figure 3:
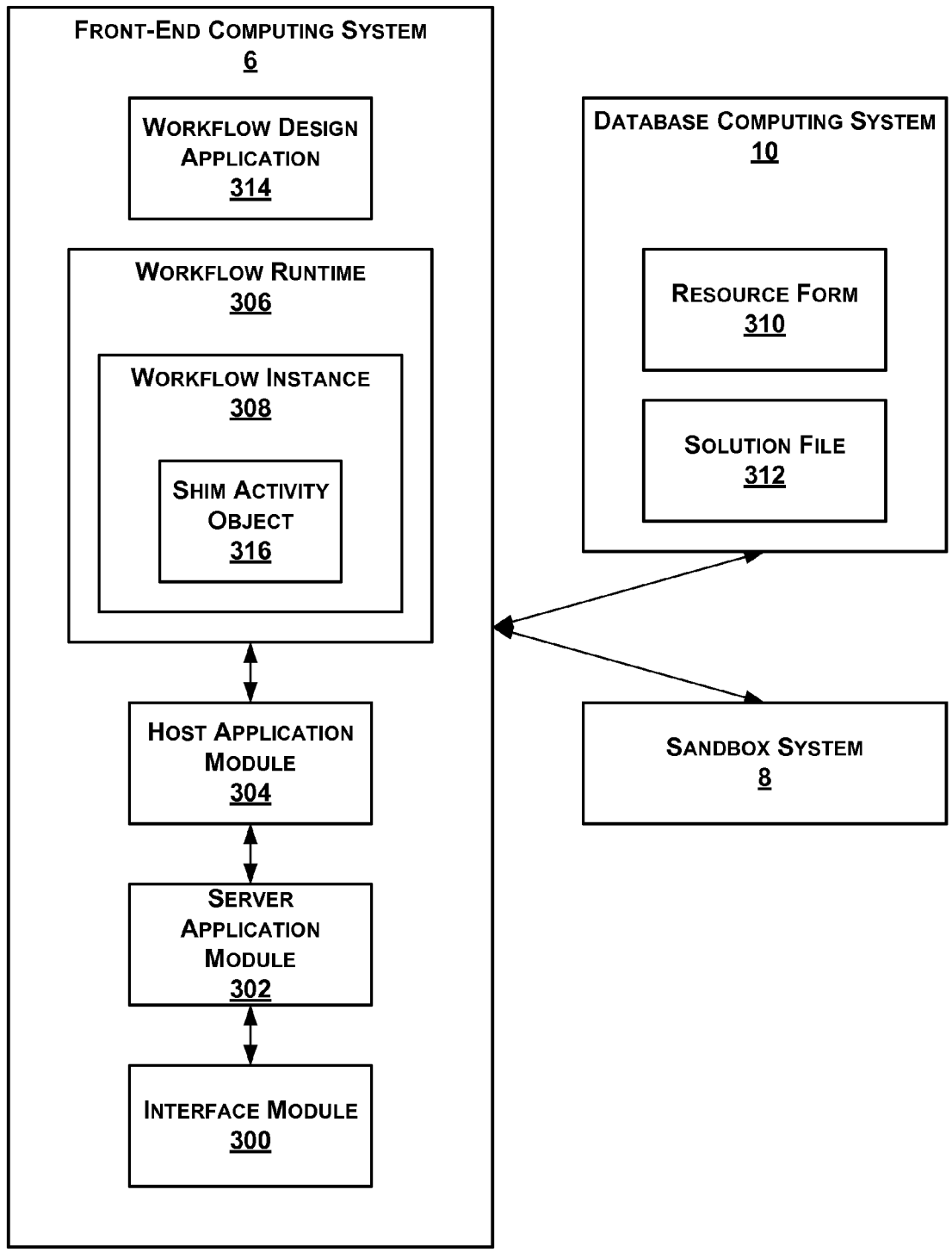
FIG. 3 is a block diagram illustrating example logical details of a front-end computing system.

FIG. 3 is a block diagram illustrating example logical details of front-end computing system 6. It should be appreciated that logical details in FIG. 3 are provided for explanatory purposes only and not intended to represent a sole way of logically organizing front-end computing system 6. Rather, many other logical organizations of front-end computing system 6 are possible.

In the example of FIG. 3, front-end computing system 6 includes an interface module 300, a server application module 302, a host application module 304, a workflow runtime 306, a workflow instance 308, a workflow design application 314 and a shim activity object 316. It should be appreciated that other implementations may include more or fewer modules.

Interface module 300 receives service requests from client applications and sends responses to the client applications. For example, interface module 300 may receive HTTP requests sent via network 12 from a web browser application operating on client computing system 4. In this example, interface module 300 may also send HTTP responses to the web browser application operating on client computing system 4. In one example implementation, interface module 300 may assemble Ethernet frames into IP packets, assemble the IP packets into TCP messages, and assemble the TCP messages into HTTP requests.

Server application module 302 receives service requests from interface module 300. For example, server application module 302 may receive an HTTP request from interface module 300, the HTTP request specifying a particular resource hosted by front-end computing system 6. Server application module 302 uses host application module 304 to process some or all service requests received by server application module 302. For example, server application module 302 may use host application module 304 to process all HTTP requests requesting ASP.NET resources.

As explained in detail below with reference to FIG. 5, when host application module 304 receives a request to process a resource, host application module 304 retrieves a resource form 310 from database computing system 10. Resource form 310 specifies how host application module 304 is to build the resource. In one example implementation, resource form 310 is an XML file. After retrieving resource form 310, host application module 304 processes resource form 310 to build the resource. After building the resource, host application module 304 provides the resource to server application module 302. Server application module 302 may then use interface module 300 to send the resource to a client application.

If host application module 304 determines as a result of processing resource form 310 that building the resource requires the initiation of a workflow, host application module 304 retrieves a solution file 312 stored at database computing system 10. In one example implementation, solution file 312 contains an elements file, one or more workflow files, and a set of activity assemblies. In this example implementation, the elements file is an XML file containing XML nodes that identify each workflow and each activity assembly in the solution file.

Each workflow file in solution file 312 specifies the activities in a workflow and how the activities in the workflow relate to one another. In one implementation, each workflow file in the solution file is an XML file containing a hierarchy of XML activity elements. Each activity element indicates an activity in the workflow. A root activity element in the hierarchy denotes a first activity in the workflow. The root activity element has one or more child activity elements indicating activities invoked by the first activity. In one example, the root activity element specifies an activity that sequentially invokes activities specified by each child activity element of the root activity element. For example, the hierarchy may contain activity elements specifying each of the activities illustrated in the example of FIG. 2.

Each activity element in the hierarchy may include attributes specifying properties of the activity. For instance, the hierarchy may include a first activity element and a second activity element, the first activity element specifying a first activity and the second activity element specifying a second activity. In this instance, the first activity element may include an attribute that specifies that the value of a property of the first activity is bound to a property of the second activity. In another instance, an activity element specifying the shim activity includes an attribute specifying a custom activity assembly.

In some instances, each workflow file in the solution file is a compiled workflow file. The compiled workflow files may be compiled versions of the previously mentioned XML files. The compiled workflow files may be DLLs. It may be more efficient to execute compiled workflow files than the previously mentioned XML files.

After retrieving solution file 312, host application module 304 uses one of the workflow files in solution file 312 to initialize workflow instance 308 within workflow runtime 306. When host application module 304 initializes workflow instance 308, workflow runtime 306 instantiates activity objects for each activity specified in the workflow file. Each of the activity objects is an instance of an activity assembly associated with an activity in the workflow. If the workflow includes a shim activity, the plurality of activity objects includes a shim activity object. For sake of simplicity, shim activity object 316 is the only activity object in workflow instance 308 shown in the example of FIG. 3.

When workflow runtime 306 instantiates an activity object, workflow runtime 306 uses the workflow file to initialize one or more properties of the activity object. For example, a workflow file may include a parent activity element and a child activity element, the parent activity element indicating a first activity and the child activity element indicating a second activity. In this example, the child activity element may include an attribute specifying that the value of a property of the second activity is bound to a value of a property of the first activity. In this example, workflow runtime 306 instantiates a first activity object and a second activity object, the first activity object indicating the parent activity and the second activity object indicating the child activity. In this example, workflow runtime 306 binds the value of a property of a second activity object to the value of the property of the first activity object. In a second example, an activity element in a workflow file indicates a shim activity. In this second example, the node includes an attribute that specifies a custom activity assembly. In this second example, workflow runtime 306 instantiates an activity object that is an instance of the shim activity assembly associated with the shim activity. In this second example, when workflow runtime 306 instantiates the activity object, workflow runtime 306 sets a property of the activity object to specify the custom activity assembly.

If host application module 304 determines as a result of processing resource form 310 that building the resource requires interaction with an existing workflow instance, host application module 304 generates events. The events may spur transitions between activities in the workflow instance.

Workflow design application 314 enables a user to design workflows. As described below with reference to FIG. 9, workflow design application 314 presents a user interface that includes representations of available activities. The representations of the available activities identify activities that are available to be included in a workflow, but do not show implementation details of the activities. The user may manipulate the representations of the available activities within the user interface to add activities to the workflow. In some implementations, workflow design application 314 may operate at other computing systems. For example, workflow design application 314 may operate at a design computing system. In this example, the design computing system is an electronic computing system. In another example, workflow design application 314 may operate at client computing system 4.

Interface module 300, server application module 302, host application module 304, workflow runtime 306, workflow instance 308, workflow design application 314 and shim activity object 316 may be implemented in a wide variety of ways. In a first example, interface module 300, server application module 302, host application module 304, workflow runtime 306, workflow instance 308, workflow design application 314 and/or shim activity object 316 may be implemented as sets of instructions stored at a data storage system. As used in this disclosure, a data storage system is a set of one or more computer-readable data storage mediums. In this first example, a processing unit within front-end computing system 6 may execute the sets of instructions, thereby causing front-end computing system 6 to perform the behaviors associated with interface module 300, server application module 302, host application module 304, workflow runtime 306, workflow instance 308, workflow design application 314 and/or shim activity object 316. As used in this disclosure, a processing unit is a set of one or more physical electronic integrated circuits that are capable of executing instructions. In a second example, interface module 300, server application module 302, host application module 304, workflow runtime 306, workflow instance 308, workflow design application 314 and/or shim activity object 316 are implemented as one or more application-specific integrated circuits (ASICs). The ASICs cause front-end computing system 6 to perform the behaviors associated with interface module 300, server application module 302, host application module 304, workflow runtime 306, workflow instance 308, workflow design application 314 and/or shim activity object 316. In this second example, the ASICs may be specifically designed to perform the behaviors associated with interface module 300, server application module 302, host application module 304, workflow runtime 306, workflow instance 308, workflow design application 314 and/or shim activity object 316.

Figure 4:
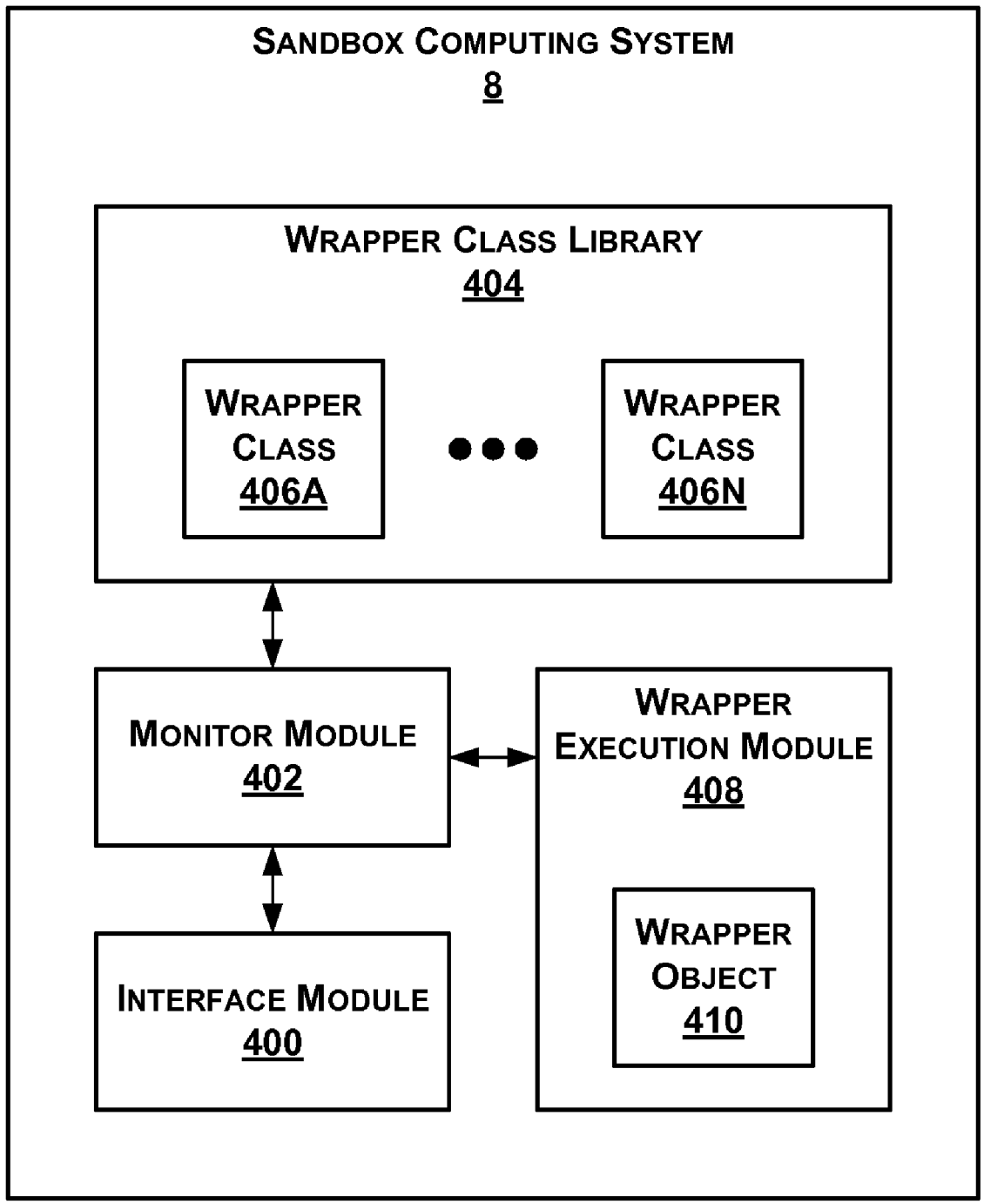
FIG. 4 is a block diagram illustrating example logical details of a sandbox computing system.

FIG. 4 is a block diagram illustrating example logical details of sandbox computing system 8. It should be appreciated that logical details in FIG. 4 are provided for explanatory purposes only and not intended to represent a sole way of logically organizing sandbox computing system 8. Rather, many other logical organizations of sandbox computing system 8 are possible.

As illustrated in the example of FIG. 4, sandbox computing system 8 includes an interface module 400, a monitor module 402, a wrapper class library 404, wrapper classes 406A through 406N (collectively, "wrapper classes 406"), a wrapper execution module 408, and a wrapper object 410. As described in detail below with regard to FIGS. 7 and 8, interface module 400 receives custom activity assemblies from front-end computing system 6. With each custom activity assembly, interface module 400 receives an initial workflow context object and a wrapper class identifier. Interface module 400 provides custom activity assemblies, initial workflow context objects, and wrapper identifiers to monitor module 402. Monitor module 402 uses the wrapper identifiers to select appropriate wrapper classes 406 in wrapper class library 404.

Upon selecting one of wrapper classes 406, monitor module 402 instantiates the selected wrapper class in wrapper execution module 408, providing a custom activity assembly and an initial context object to the instance of the selected wrapper class. In the example of FIG. 4, wrapper object 410 is an instance of the selected wrapper class. Monitor module 402 then causes wrapper execution module 408 to generate a custom activity object. The custom activity object is an instance of the custom activity assembly. After generating the custom activity object, the instance of the selected wrapper class initiates execution the custom activity object. Monitor module 402 uses interface module 400 to send to front-end system a modified workflow context object generated by executing the custom activity object.

Each of wrapper classes 406 implements the same interface. For example, each of wrapper classes 406 may implement an execute method. Each of wrapper classes 406 may enable sandbox computing system 8 to run a different type of partially-trusted assembly. For example, wrapper class 406A may enable sandbox computing system 8 to run custom activity assemblies. Furthermore, in this example wrapper class 406B may enable sandbox computing system 8 to run custom event handlers.

Interface module 400, monitor module 402, wrapper class library 404, wrapper classes 406, wrapper execution module 408 and wrapper object 410 may be implemented in a wide variety of ways. In a first example, interface module 400, monitor module 402, wrapper class library 404, wrapper classes 406, wrapper execution module 408 and/or wrapper object 410 may be implemented as sets of instructions stored at a data storage system. In this first example, a processing unit within sandbox computing system 8 may execute the sets of instructions, thereby causing sandbox computing system 8 to perform the behaviors associated with interface module 400, monitor module 402, wrapper class library 404, wrapper classes 406, wrapper execution module 408 and/or wrapper object 410. In a second example, interface module 400, monitor module 402, wrapper class library 404, wrapper classes 406, wrapper execution module 408 and/or wrapper object 410 are implemented as one or more ASICs. The ASICs cause sandbox computing system 8 to perform the behaviors associated with interface module 400, monitor module 402, wrapper class library 404, wrapper classes 406, wrapper execution module 408 and/or wrapper object 410. In this second example, the ASICs may be specifically designed to perform the behaviors associated with interface module 400, monitor module 402, wrapper class library 404, wrapper classes 406, wrapper execution module 408 and/or wrapper object 410.

Figure 5:
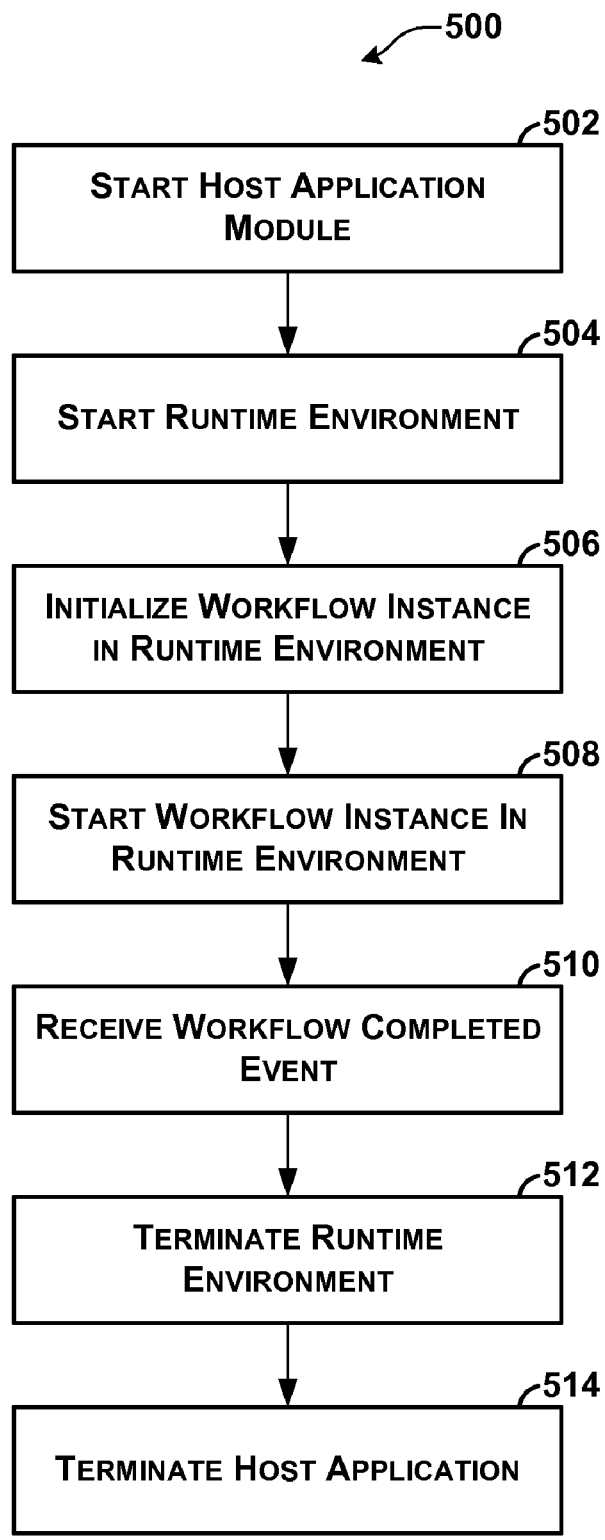
FIG. 5 is a flowchart illustrating an example operation of a host application.

FIG. 5 is a flowchart illustrating an example operation 500 of host application module 304. It should be appreciated that operation 500 is merely an example operation of host application module 304. Many other operations of host application module 304 are possible. For instance, other operations of host application module 304 may include more or fewer steps. In other instances, operations of host application module 304 may include the steps of operation 500 in different orders.

Operation 500 starts with the start of the host application module 304 (502). After host application module 304 starts, host application module 304 starts workflow runtime 306 (504). For example, host application module 304 may start workflow runtime 306 by invoking a constructor method of a runtime environment class to create workflow runtime 306. In this example, host application module 304 then invokes a start runtime method of workflow runtime 306.

After starting workflow runtime 306, host application module 304 initializes workflow instance 308 in workflow runtime 306 (506). In one example implementation, host application module 304 initializes workflow instance 308 by invoking a "CreateWorkflow" method of workflow runtime 306, providing a Type object as a parameter. In this example implementation, the Type object specifies a type of workflow to create. Furthermore, in this example implementation, the "CreateWorkflow" method returns a reference to an instance of a workflow of the type indicated by the Type object. For instance, the "CreateWorkflow" method may return a reference to workflow instance 308. Host application module 304 may then, in this example implementation, invoke a "Start" method of the instance of the workflow, thereby causing workflow runtime 306 to start the instance of the workflow.

Once host application module 304 initializes workflow instance 308 in workflow runtime 306, host application module 304 starts execution of workflow instance 308 (508). In one example implementation, host application module 304 starts execution of workflow instance 308 by invoking a "Start" method of workflow instance 308. In this example implementation, invoking the "Start" method of workflow instance 308 causes workflow runtime 306 to execute an activity assembly associated with the start activity of workflow instance 308.

After starting execution of workflow instance 308, host application module 304 receives a workflow completed event (510). The workflow completed event indicates that workflow instance 308 has completed execution. It should be appreciated that prior to receiving the workflow completed event, host application module 304 may receive other events regarding workflow instance 308 from workflow runtime 306. For example, host application module 304 may receive one or more workflow suspended events, workflow aborted events, workflow idled events, workflow resumed events, and/or other types of events regarding workflow instance 308 from workflow runtime 306.

After host application module 304 receives the workflow complete event, host application module 304 terminates workflow runtime 306 (512). It should be appreciated that host application module 304 does not need to terminate workflow runtime 306 immediately after receiving the workflow completed event. Rather, host application module 304 may continue to initialize and start an indefinite number of workflow instances. In one example implementation, host application module 304 may terminate workflow runtime 306 by invoking a "StopRuntime" method of the workflow runtime 306. In this example implementation, the "StopRuntime" method unloads each workflow instance operating in workflow runtime 306 and stops all services in workflow runtime 306.

Next, host application module 304 terminates (514). It should be appreciated that host application module 304 may perform a variety of activities between the time that host application module 304 terminates workflow runtime 306 and the time that host application module 304 terminates.

Figure 6:
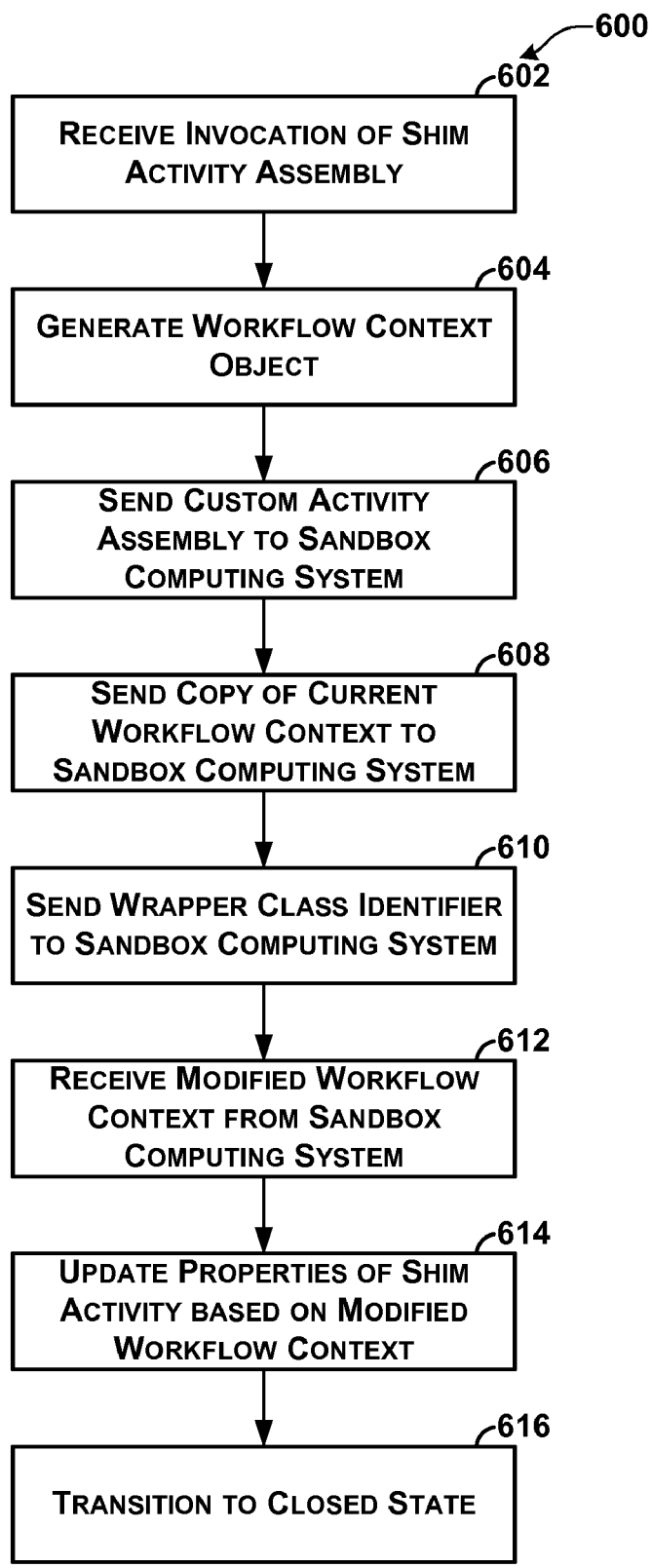
FIG. 6 is a flowchart illustrating an example operation of a shim activity object.

FIG. 6 is a flowchart illustrating an example operation 600 of shim activity object 316. Many other operations of shim activity object 316 are possible. For instance, other operations of shim activity objects may include more or fewer steps. In other instances, operations of shim activity objects may include the steps of operation 600 in different orders.

Initially, shim activity object 316 receives an invocation of shim activity object 316 (602). For example, workflow runtime 306 may invoke shim activity object 316. In this example, workflow runtime 306 may invoke shim activity object 316 by invoking an "Execute" method of shim activity object 316.

After being invoked, shim activity object 316 generates an initial workflow context object (604). The initial workflow context object has a plurality of properties. The plurality of properties includes values of property of shim activity object 316. In addition, the initial workflow context object may include objects that perform services in workflow runtime 306. In addition, the initial workflow context object may include values of contextual properties of workflow instance 308. The contextual properties of workflow instance 308 relate to a context in which workflow instance 308 operates. The contextual properties of workflow instance 308 may include a URL associated with a document being processed by workflow instance 308. In addition, the initial workflow context object may include values of properties of other activity objects in workflow instance 308.

Next, shim activity object 316 sends the custom activity assembly to sandbox computing system 8 (606). Shim activity object 316 also sends the initial workflow context object to sandbox computing system 8 (608). As mentioned above, sandbox computing system 8 is configured to generate and execute a custom activity object that is an instance of the custom activity assembly. In addition, shim activity object 316 sends a wrapper class identifier to sandbox computing system 8 (610). The wrapper class identifier identifies a wrapper class to use to deserialize the initial workflow context object and to execute the custom activity object. It should be appreciated that in some example implementations, shim activity object 316 sends the custom activity assembly, the initial workflow context object and the wrapper class identifier to sandbox computing system 8 in a single message.

After sending the custom activity assembly, the initial workflow context object and the wrapper class identifier to sandbox computing system 8, shim activity object 316 receives a modified workflow context object from sandbox computing system 8 (612). The modified workflow context object includes properties having values equivalent to values of the properties of the custom activity object as well as values of other workflow context properties. In this way, shim activity object 316 receives values of properties of the custom activity object updated during execution of the custom activity object.

After receiving the modified workflow context object, shim activity object 316 updates values of properties of shim activity object 316 based on the values of the properties of the modified workflow context object (614). For example, if the custom activity object generates a digital image of a pie chart, the modified context object includes a property having a value specifying the digital image. In this example, shim activity object 316 may update a "ChartImage" property of shim activity object 316 to specify the digital image.

Next, shim activity object 316 transitions to a closed state (616). Transitioning to the closed state informs workflow runtime 306 that execution of shim activity object 316 is complete.

Figure 7:
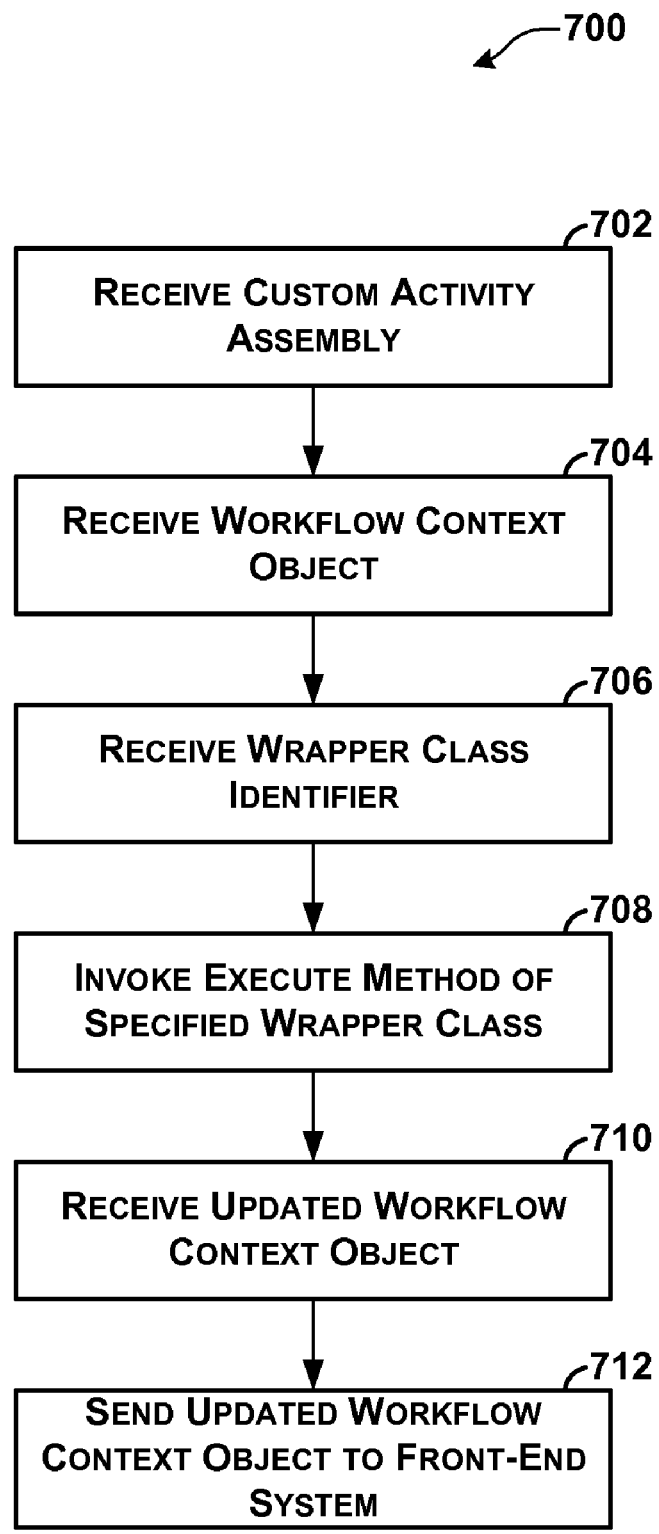
FIG. 7 is a flowchart illustrating an example operation of a monitor module at the sandbox computing system.

FIG. 7 is a flowchart illustrating an example operation 700 of monitor module 402 in sandbox computing system 8. Many other operations of monitor module 402 are possible. For instance, other operations of monitor module 402 may include more or fewer steps. In other instances, operations of monitor module 402 may include the steps of operation 700 in different orders.

Initially, monitor module 402 receives a custom activity assembly from front-end computing system 6 (702). Monitor module 402 also receives an initial workflow context object from front-end computing system 6 (704). In addition, monitor module 402 receives a wrapper class identifier (706).

After monitor module 402 receives the custom activity assembly, the workflow context object and the wrapper class identifier, monitor module 402 invokes an execute method of a wrapper object (708). The wrapper object is an instance of the wrapper class specified by the wrapper class identifier. When monitor module 402 invokes the execute method of the wrapper object, monitor module 402 provides the custom activity assembly and the workflow context object to the execute method of the wrapper object.

Subsequently, monitor module 402 receives a modified workflow context object from the execute method of the wrapper object (710). Upon receiving the modified workflow context object, monitor module 402 sends the modified workflow context object to front-end computing system 6 (712).

Figure 8:
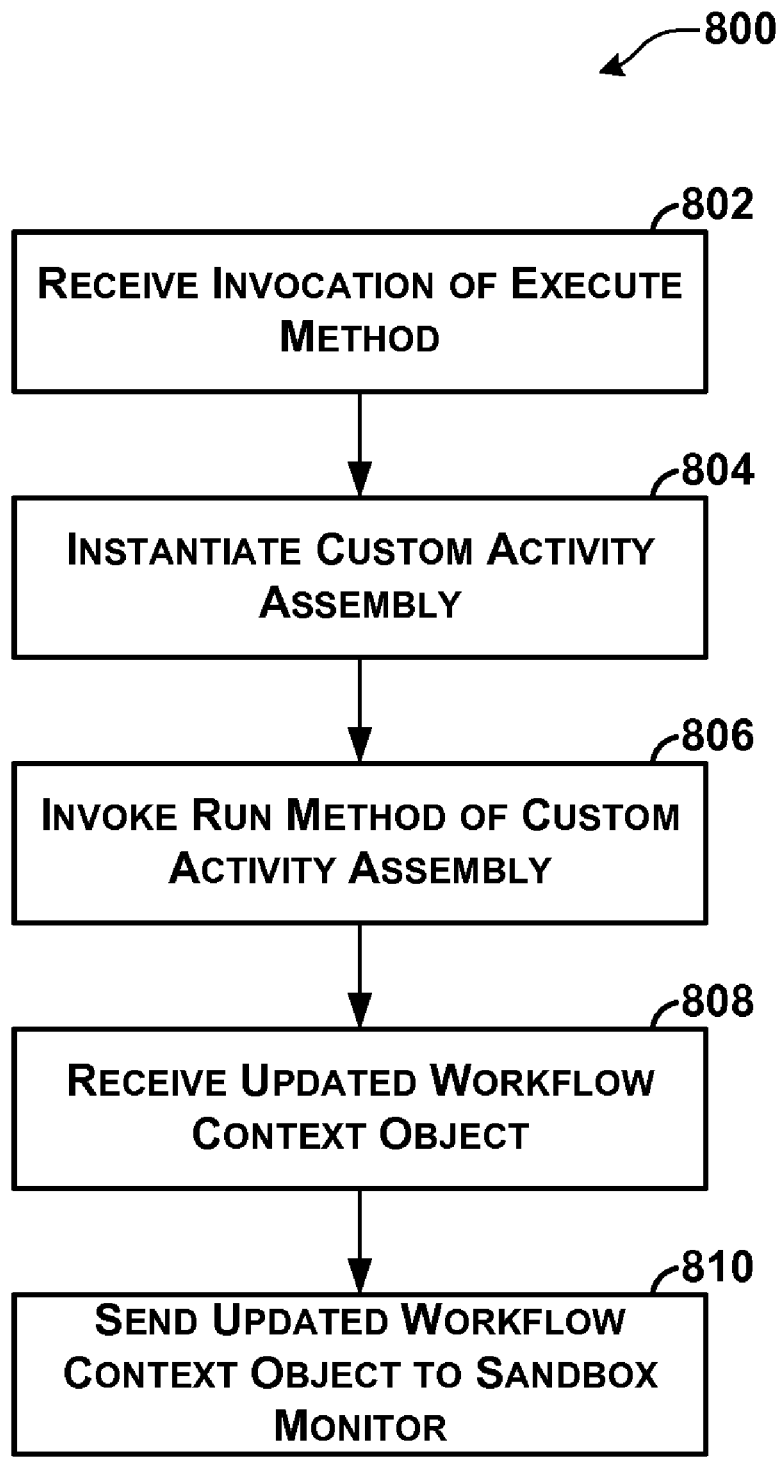
FIG. 8 is a flowchart illustrating an example operation of a wrapper class at the sandbox computing system.

FIG. 8 is a flowchart illustrating an example operation 800 of wrapper object 410 in sandbox computing system 8. Many other operations of wrapper object 410 are possible. For instance, other operations of wrapper object 410 may include more or fewer steps. In other instances, operations of wrapper object 410 may include the steps of operation 800 in different orders. Furthermore, instances of other ones of the wrapper classes 406 in wrapper class library 404 may perform operation 800.

Initially, wrapper object 410 receives an invocation of an execute method of wrapper object 410 (802). When wrapper object 410 receives an invocation of the execute method, wrapper object 410 may also receive the custom activity assembly and a serialized version of the initial workflow context object.

Next, wrapper object 410 automatically instantiates the custom activity assembly and the initial workflow context object (804). After wrapper object 410 has instantiated the custom activity assembly and the initial workflow context object, wrapper object 410 invokes an execute method of the custom activity object (806). The execute method of the custom activity object starts execution of the custom activity object.

After wrapper object 410 invokes the execute method of the custom activity object, wrapper object 410 receives a modified workflow context object from the custom activity object (808). Wrapper object 410 then sends the modified workflow context object to monitor module 402 for transmission to front-end computing system 6 (810).

Figure 9:
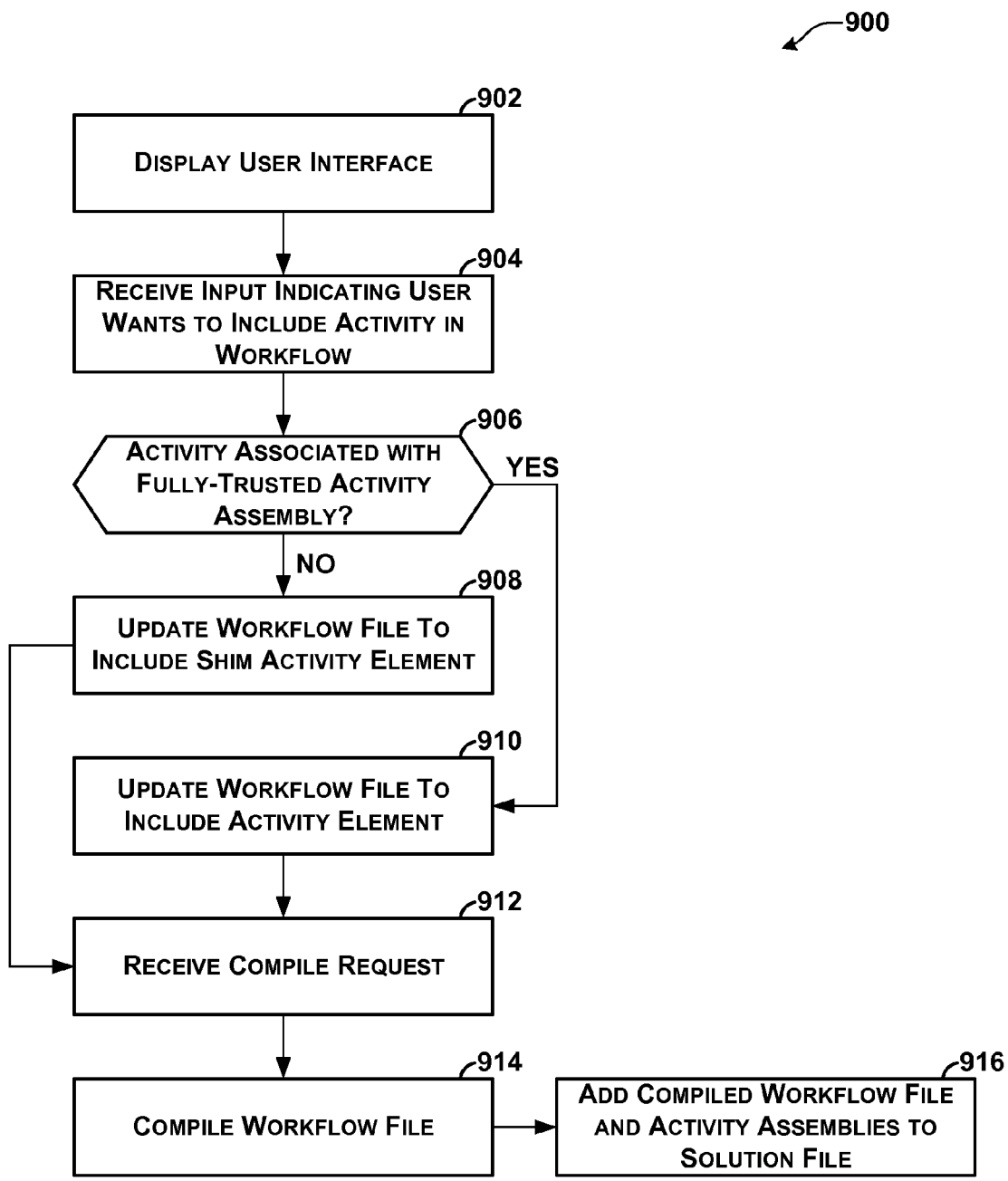
FIG. 9 is a flowchart illustrating an example operation of a workflow design application.

FIG. 9 is a flowchart illustrating an example operation 900 of workflow design application 314. Many other operations of workflow design application 314 are possible. For instance, other operations of workflow design application 314 may include more or fewer steps. In other instances, operations of workflow design application 314 may include the steps of operation 900 in different orders.

In the example of FIG. 9, operation 900 starts when workflow design application 314 displays a user interface on a display device (902). In one example implementation, the user interface initially contains representations of available activities to include in a workflow. The representations of the available activities identify the available activities to a user, but do not show implementation details of the available activities. For example, the representations of the available activities may be textual titles of the available activities. The available activities may include pre-made activities and/or custom activities. Pre-made activities are activities implemented by activity assemblies shipped with workflow design application 314. Custom activities are activities that are implemented by activity assemblies not shipped with workflow design application 314. It should be understood that some custom activities may be implemented by activity assemblies that are fully-trusted by an administrator of front-end computing system 6 and that other custom activities may be implemented by activity assembles that are only partially trusted by the administrator.

After workflow design application 314 displays the user interface, workflow design application 314 receives input from user (904). The input indicates that the user wants to include the custom activity in the workflow. For example, the input may be drag-and-drop input. In this example, the user may drag a title of an available activity into a canvas area of the user interface and drop the title at a particular position relative to other activities in the canvas area. In a second example, the input may be a selection of a title of an activity from a list of available activities. In this second example, workflow design application 313 may, in response to receiving the input, display a natural language sentence associated with the selected activity in the user interface.

When workflow design application 314 has received the input, workflow design application 314 determines whether the input indicates an activity associated with a fully-trusted activity assembly (906). Workflow design application 314 may determine whether the input indicates an activity associated with a fully-trusted activity assembly in a variety of ways. For example, each fully-trusted activity assembly may be digitally signed by an entity trusted by the administrator of front-end computing system 6. In this example, workflow design application 314 determines that the activity is not associated with a fully-trusted activity assembly when the activity is associated with an activity assembly that is not digitally signed by such an entity.

In response to determining that the input indicates an activity not associated with a fully-trusted activity assembly ("NO" of 906), workflow design application 314 updates a workflow file to include a shim activity element indicating the shim activity (908). In one example implementation, the shim activity element is an XML element indicating a shim activity. The workflow file defines the workflow. Thus, by adding the shim activity element to the workflow file, workflow design application 314 adds the shim activity to the workflow. The shim activity element includes an attribute specifying the partially-trusted activity assembly.

In response to determining that the input indicates an activity implemented using a fully-trusted activity assembly ("YES" of 906), workflow design application 314 updates the workflow file to include an activity element indicating the activity (910).

At some time after either adding the shim activity element to the workflow file or adding the activity element indicating the activity to the workflow file, workflow design application 314 receives a compile request (912). It should be appreciated that the user may add and/or remove an indefinite number of activities from the workflow prior to making the compile request. In response to receiving the compile request, workflow design application 314 compiles the workflow file into a compiled workflow file (914). In some example instances, a computing system may instantiate the workflow using the compiled workflow file more than efficiently than using the workflow file. Furthermore, in some example implementations, a module at front-end computing system 6 receives the compile request and compiles the workflow file. In addition, in some example implementations, the compile request is received from a user. In other example implementations, the compile request is received from another module or application.

After compiling the workflow file, workflow design application 314 adds the compiled workflow file and any activity assemblies implementing custom activities to a solution file (916). Subsequently, the solution file may then be installed on a computing system.

Figure 10:
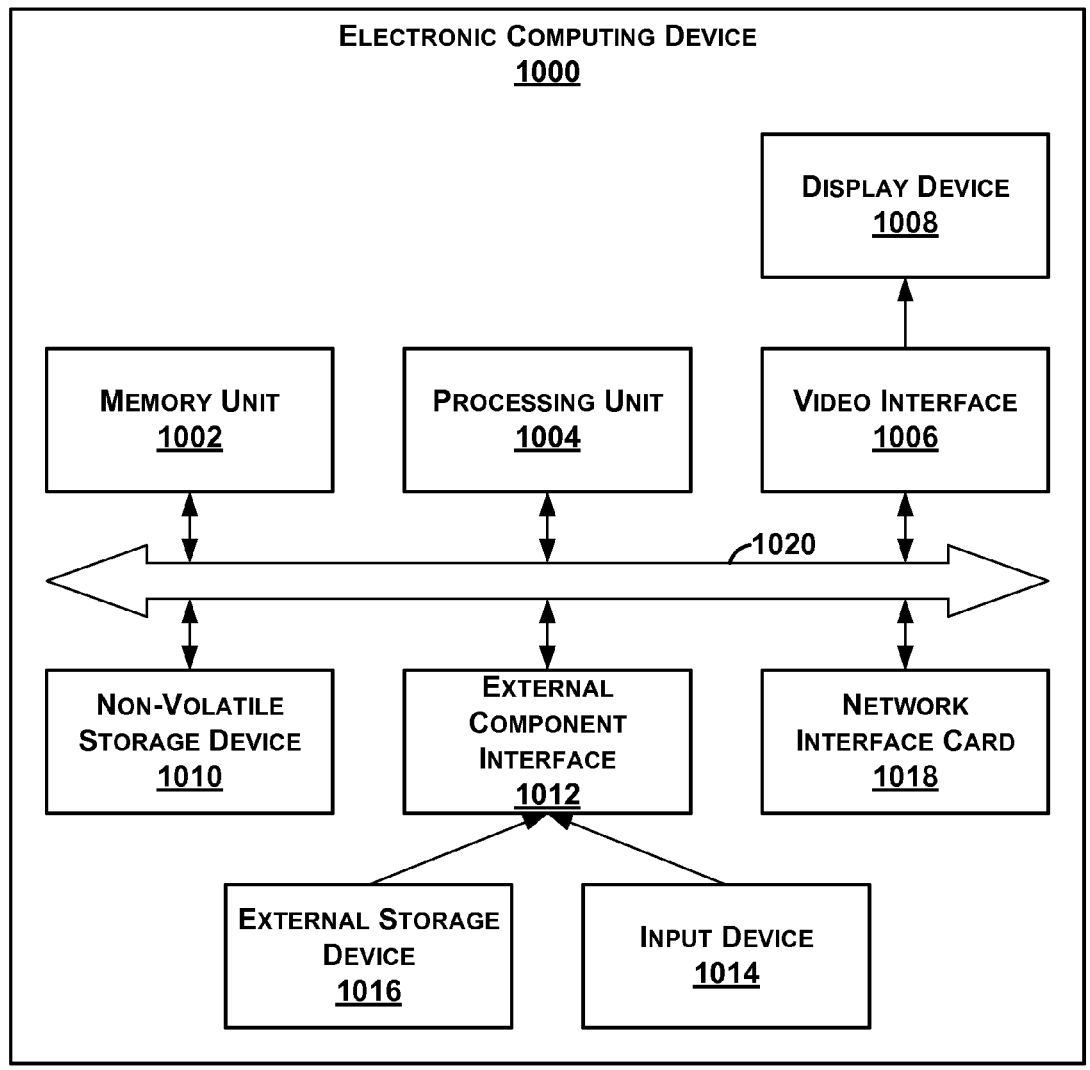
FIG. 10 is a block diagram illustrating example physical components of an electronic computing system.

FIG. 10 is a block diagram illustrating example physical components of an electronic computing device 1000. As illustrated in the example of FIG. 10, electronic computing device 1000 comprises a memory unit 1002. Memory unit 1002 is a computer-readable data storage medium capable of storing data and/or instructions. Memory unit 1002 may be a variety of different types of computer-readable storage media including, but not limited to, dynamic random access memory (DRAM), double data rate synchronous dynamic random access memory (DDR SDRAM), reduced latency DRAM, DDR2 SDRAM, DDR3 SDRAM, Rambus RAM, or other types of computer-readable storage media.

In addition, electronic computing device 1000 comprises a processing unit 1004. As mentioned above, a processing unit is a set of one or more physical electronic integrated circuits that are capable of executing instructions. In a first example, processing unit 1004 may execute software instructions that cause electronic computing device 1000 to provide specific functionality. In this first example, processing unit 1004 may be implemented as one or more processing cores and/or as one or more separate microprocessors. For instance, in this first example, processing unit 1004 may be implemented as one or more Intel Core 2 microprocessors. Processing unit 1004 may be capable of executing instructions in an instruction set, such as the x86 instruction set, the POWER instruction set, a RISC instruction set, the SPARC instruction set, the IA-64 instruction set, the MIPS instruction set, or another instruction set. In a second example, processing unit 1004 may be implemented as an ASIC that provides specific functionality. In a third example, processing unit 1004 may provide specific functionality by using an ASIC and by executing software instructions.

Electronic computing device 1000 also comprises a video interface 1006. Video interface 1006 enables electronic computing device 1000 to output video information to a display device 1008. Display device 1008 may be a variety of different types of display devices. For instance, display device 1008 may be a cathode-ray tube display, an LCD display panel, a plasma screen display panel, a touch-sensitive display panel, a LED array, or another type of display device.

In addition, electronic computing device 1000 includes a non-volatile storage device 1010. Non-volatile storage device 1010 is a computer-readable data storage medium that is capable of storing data and/or instructions. Non-volatile storage device 1010 may be a variety of different types of non-volatile storage devices. For example, non-volatile storage device 1010 may be one or more hard disk drives, magnetic tape drives, CD-ROM drives, DVD-ROM drives, Blu-Ray disc drives, or other types of non-volatile storage devices.

Electronic computing device 1000 also includes an external component interface 1012 that enables electronic computing device 1000 to communicate with external components. As illustrated in the example of FIG. 10, external component interface 1012 enables electronic computing device 1000 to communicate with an input device 1014 and an external storage device 1016. In one implementation of electronic computing device 1000, external component interface 1012 is a Universal Serial Bus (USB) interface. In other implementations of electronic computing device 1000, electronic computing device 1000 may include another type of interface that enables electronic computing device 1000 to communicate with input devices and/or output devices. For instance, electronic computing device 1000 may include a PS/2 interface. Input device 1014 may be a variety of different types of devices including, but not limited to, keyboards, mice, trackballs, stylus input devices, touch pads, touch-sensitive display screens, or other types of input devices. External storage device 1016 may be a variety of different types of computer-readable data storage media including magnetic tape, flash memory modules, magnetic disk drives, optical disc drives, and other computer-readable data storage media.

In addition, electronic computing device 1000 includes a network interface card 1018 that enables electronic computing device 1000 to send data to and receive data from an electronic communication network. Network interface card 1018 may be a variety of different types of network interface. For example, network interface card 1018 may be an Ethernet interface, a token-ring network interface, a fiber optic network interface, a wireless network interface (e.g., WiFi, WiMax, etc.), or another type of network interface.

Electronic computing device 1000 also includes a communications medium 1020. Communications medium 1020 facilitates communication among the various components of electronic computing device 1000. Communications medium 1020 may comprise one or more different types of communications media including, but not limited to, a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

Electronic computing device 1000 includes several computer-readable data storage media (i.e., memory unit 1002, non-volatile storage device 1010, and external storage device 1016). Together, these computer-readable storage media may constitute a single data storage system. As discussed above, a data storage system is a set of one or more computer-readable data storage mediums. This data storage system may store instructions executable by processing unit 1004. Activities described in the above description may result from the execution of the instructions stored on this data storage system. Thus, when this description says that a particular logical module performs a particular activity, such a statement may be interpreted to mean that instructions of the logical module, when executed by processing unit 1004, cause electronic computing device 1000 to perform the activity. In other words, when this description says that a particular logical module performs a particular activity, a reader may interpret such a statement to mean that the instructions configure electronic computing device 1000 such that electronic computing device 1000 performs the particular activity.

The techniques of this disclosure may be realized in many ways. For example, the techniques of this disclosure may be realized as a method of executing workflows. The method comprises initializing, at a front-end computing system, a workflow instance, the workflow instance being an instance of a workflow, the workflow containing a plurality of activities, the workflow instance containing a plurality of activity objects, each activity object in the plurality of activity objects being an instance of an activity assembly in a plurality of activity assemblies, each activity assembly in the plurality of activity assemblies implementing an activity in the plurality of activities, the plurality of activities including a shim activity, the plurality of activity objects containing a shim activity object implementing the shim activity, the shim activity object being an instance of a shim activity assembly in the plurality of activity assemblies, the shim activity assembly being fully trusted by an administrator of the front-end computing system, the workflow implementing a business process of an enterprise, each activity in the plurality of activities implementing a task in the business process, the shim activity object including a property specifying a custom activity assembly, the custom activity assembly not being fully trusted by an administrator of the front-end computing system, the custom activity assembly implementing a custom activity. The method also comprises during execution of the workflow instance at the front-end computing system, executing, at the front-end computing system, the shim activity object, execution of the shim activity object causing the front-end computing system to: automatically send the custom activity assembly to a sandbox computing system via an electronic communications network, the sandbox computing system configured to generate a custom activity object instantiating the custom activity assembly automatically, the sandbox computing system configured to execute the custom activity object automatically, the sandbox computing system being isolated from the front-end computing system such that unexpected behavior of the sandbox computing system does not cause unexpected behavior of the front-end computing system. Execution of the shim activity object also causes the front-end computing system to receive, after sending the custom activity assembly to the sandbox computing system, a modified workflow context object via the electronic communications network, the modified workflow context object including properties having values equivalent to values of properties of the custom activity object. In response to receiving the modified workflow context object, execution of the shim activity object causes the front-end computing system to update values of properties of the shim activity object based on the values of the properties of the modified workflow context object. Furthermore, after updating the values of the properties of the shim activity object, execution of the shim activity object causes the front-end computing system to complete execution of the shim activity object. The method also comprises after completing execution of the shim activity object, completing, at the front-end computing system, execution of the workflow instance, thereby completing the business process.

In another example the techniques of this disclosure may be realized as an electronic computing system. The electronic computing system comprises a processing unit. The electronic computing system also comprises a data storage system storing instructions that, when executed by the processing unit, configure the electronic computing system such that the electronic computing system initializes a workflow instance, the workflow instance being an instance of a workflow, the workflow comprising a plurality of activities, the plurality of activities including a shim activity, the workflow implementing a business process of an enterprise. The instructions also configure the electronic computing system such that the electronic computing system, after initializing the workflow instance, starts execution of the workflow instance. In addition, the instructions also configure the electronic computing system such that the electronic computing system, during execution of the workflow instance, executes a shim activity object implementing the shim activity, the shim activity object being an instantiation of a shim activity assembly that is fully-trusted by an administrator of the electronic computing system. Execution of the shim activity object causing the electronic computing system to automatically send a custom activity assembly to a sandbox computing system via an electronic communications network, the sandbox computing system configured to generate and execute a custom activity object, the custom activity object being an instantiation of the custom activity assembly, the custom activity object implementing a custom activity, the sandbox computing system being isolated from the front-end computing system such that unexpected behavior of the sandbox computing system does not cause the electronic computing system to perform unexpected behavior. Execution of the shim activity object also causes the electronic computing system to automatically send an initial workflow context object to the sandbox computing system, the initial workflow context object including properties, the sandbox computing system configured to use values of the properties of the initial context object as initial values of properties of the custom activity object. Furthermore, execution of the shim activity object causes the electronic computing system to, after sending the custom activity assembly and the initial workflow context object, receive a modified workflow context object from the sandbox computing system, the modified workflow context object including properties having values equivalent to values of properties of the custom activity object. Execution of the shim activity object also causes the electronic computing system to, after receiving the modified workflow context object, update values of properties of the shim activity object based on the values of the properties of the modified context object. In addition, execution of the shim activity object causes the electronic computing system to, after updating the properties of the shim activity object, complete execution of the shim activity object.

In another example, the techniques of this disclosure may be realized as a computer-readable data storage medium comprising instructions that, when executed by a processing unit of an electronic computing system, cause the electronic computing system to display, on a display device, a user interface of a workflow design application, the user interface containing representations of available activities, the representations of the available activities identifying the available activities to a user without displaying implementation details of the available activities, the available activities being activities available to be included in a workflow, the available activities including a custom activity, the custom activity associated with a custom activity assembly not shipped with the workflow design application. The instructions also cause the electronic computing system to receive drag-and-drop input from the user, the drag-and-drop input indicating that the user has manipulated the representation of the custom activity to indicate that the user wants to include the custom activity in the workflow, the workflow implementing a business process of an enterprise. In addition, the instructions cause the electronic computing system to in response to receiving the drag-and-drop input, add a shim activity element to a plurality of activity elements in a workflow extensible markup language (XML) file, each activity element in the plurality of activity elements indicating an activity in the workflow, each activity in the workflow associated with an activity assembly in a plurality of activity assemblies, the shim activity element including an attribute specifying the custom activity assembly, the shim activity associated with a shim activity assembly in the plurality of activity assemblies, the shim activity assembly being fully trusted by an administrator of the electronic computing system, the custom activity assembly not being fully trusted by the administrator of the electronic computing system. Furthermore, the instructions cause the electronic computing system to, after adding the shim activity element to the plurality of activity elements, compile the workflow XML file into a compiled workflow file defining the workflow. In addition, the instructions cause the electronic computing system to automatically add the compiled workflow file and the custom activity assembly to a solution file. The instructions also cause the electronic computing system to install the solution file at the electronic computing system. Moreover, the instructions cause the electronic computing system to, after installing the solution file, start a runtime environment. The instructions also cause the electronic computing system to, after starting the runtime environment, invoke an initialization method of the runtime environment that initializes a workflow instance in the runtime environment, the workflow instance being an instance of the workflow defined by the compiled workflow file, the workflow instance including a plurality of activity objects, each activity object in the plurality of activity objects is an instantiation of an activity assembly in the plurality of activity assemblies, the plurality of activity objects including a shim activity object, the shim activity object being an instance of the shim activity assembly. In addition, the instructions cause the electronic computing system to, after invoking the initialization method, invoke a start method of the workflow instance, the start method of the workflow instance initiating execution of activity objects in the plurality of activity object in the workflow instance, execution of the shim activity object causing the electronic computing system to automatically send the custom activity assembly to a sandbox computing system via an electronic communications network, the sandbox computing system configured to automatically execute the custom activity assembly, the sandbox computing system being isolated from the electronic computing system such that the electronic computing system is not disabled by unexpected behavior of the sandbox computing system caused by execution of the custom activity assembly. Execution of the shim activity object further causes the electronic computing system to automatically send an initial workflow context object to the sandbox computing system via the electronic communications network, the initial workflow context object including input parameters of the custom activity assembly. In addition, execution of the shim activity object cause the electronic computing system to automatically send a wrapper class identifier to the sandbox computing system via the electronic communications network, the wrapper class identifier identifying a wrapper class installed at the sandbox computing system, the wrapper class configured to deserialize the initial workflow context object, the wrapper class configured to initiate execution of an instance of the custom activity assembly using the input parameters included in the initial workflow context object. Moreover, execution of the shim activity object causes the electronic computing system to, after sending the custom activity assembly, the initial workflow context object and the wrapper class identifier to the sandbox computing system, automatically receive a modified workflow context object from the sandbox computing system, the modified workflow context object including properties having values equivalent to values of properties of the custom activity assembly. In addition, execution of the shim activity object causes the electronic computing system to update values of properties of the shim activity object based on the values of the properties of the modified workflow context object. Execution of the shim activity object also causes the electronic computing system to complete execution of the shim activity object.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method of executing workflows, the method comprising:
   initializing, at a front-end computing system, a workflow instance, the workflow instance being an instance of a workflow, the workflow containing a plurality of activities, the workflow instance containing a plurality of activity objects, each activity object in the plurality of activity objects being an instance of an activity assembly in a plurality of activity assemblies, each activity assembly in the plurality of activity assemblies implementing an activity in the plurality of activities, the plurality of activities including a shim activity, the plurality of activity objects containing a shim activity object implementing the shim activity, the shim activity object being an instance of a shim activity assembly in the plurality of activity assemblies, the shim activity assembly being fully trusted by an administrator of the front-end computing system, the workflow implementing a business process of an enterprise, each activity in the plurality of activities implementing a task in the business process, the shim activity object including a property specifying a custom activity assembly, the custom activity assembly not being fully trusted by an administrator of the front-end computing system, the custom activity assembly implementing a custom activity;
   during execution of the workflow instance at the front-end computing system, executing, at the front-end computing system, the shim activity object, execution of the shim activity object causing the front-end computing system to:
     automatically send the custom activity assembly to a sandbox computing system via an electronic communications network, the sandbox computing system configured to generate a custom activity object instantiating the custom activity assembly automatically, the sandbox computing system configured to execute the custom activity object automatically, the sandbox computing system being isolated from the front-end computing system such that unexpected behavior of the sandbox computing system does not cause unexpected behavior of the front-end computing system;

after sending the custom activity assembly to the sandbox computing system, receive a modified workflow context object via the electronic communications network, the modified workflow context object including properties having values equivalent to values of properties of the custom activity object;

in response to receiving the modified workflow context object, update values of properties of the shim activity object based on the values of the properties of the modified workflow context object; and after updating the values of the properties of the shim activity object, complete execution of the shim activity object; and after completing execution of the shim activity object, completing, at the front-end computing system, execution of the workflow instance, thereby completing the business process.

2. The method of claim 1, wherein execution of the shim activity object further causes the front-end computing system to send an initial workflow context object to the sandbox computing system, the sandbox computing system configured to provide the initial workflow context object to the custom activity object, the initial workflow context object including properties having values used by the sandbox computing system as values of properties of the custom activity object.

3. The method of claim 2, wherein execution of the shim activity object further causes the front-end computing system to send a wrapper class identifier to the sandbox computing system, the wrapper class identifier identifying a wrapper class installed at the sandbox computing system, the wrapper class configured to deserialize the initial workflow context object and to initiate execution of an instance of the custom activity assembly at the sandbox computing system.

4. The method of claim 1,
wherein the method further comprises:
prior to initializing the workflow instance, starting, at the front-end computing system, a runtime environment; and
after initializing the workflow instance, starting, at the front-end computing system, execution of the workflow instance in the runtime environment; and
wherein the runtime environment initiates the execution of the shim activity object by invoking a method of the shim activity object.

5. The method of claim 4, wherein the shim activity object causes the front-end computing system to complete execution of the shim activity object by causing the front-end computing system to return a completed activity status to the runtime environment.

6. The method of claim 4 further comprising:
automatically displaying, by a design computing system, a representation of the custom activity in a user interface of a workflow design application, the representation of the custom activity identifying the custom activity to a user without displaying implementation details of the custom activity, the workflow design application operating on the design computing system;
receiving, at the design computing system, input from the user, the input indicating that the user wants to include the custom activity in the workflow; and
adding, by the front-end computing system, the shim activity to the workflow when the design computing system has received the input indicating that the user wants to include the custom activity in the workflow.

7. The method of claim 6,
wherein the representation of the custom activity is a natural language sentence describing a task implemented by the custom activity;
wherein receiving the input comprises receiving, at the design computing system, a selection of the custom activity from a list of available activities; and
wherein automatically displaying the representation of the custom activity comprises displaying the natural language sentence in response to receiving a selection by the user of a title of the custom activity from a list of titles of available activities.

8. The method of claim 6 further comprising adding, at the design computing system, a shim activity element to a plurality of activity elements in a workflow file, each activity element in the plurality of activity elements indicating one of the activities in the workflow, the shim activity element specifying the custom activity assembly.

9. The method of claim 8 further comprising:
receiving, at the front-end computing system, a solution file, the solution file containing each file needed to deploy the workflow; and
installing, at the front-end computing system, the solution file.

10. The method of claim 8, wherein initializing the workflow instance comprises: automatically binding, at the front-end computing system, a value of an output property of a given activity object to a value of an input property of the shim activity object, the plurality of activity objects including the given activity object, the input property of the shim activity object being one of the properties of the shim activity object.

11. The method of claim 8,
wherein the shim activity assembly is shipped with the workflow design application; and
wherein the custom activity assembly is drafted by the user.

12. The method of claim 6,
wherein the method further comprises:
after receiving the input, determining, at the design computing system, whether the custom activity is associated with a fully-trusted activity assembly; and
in response to determining that the custom activity is associated with a fully-trusted activity assembly, automatically adding, at the design computing system, the custom activity to the workflow; and
wherein adding the shim activity to the workflow comprises adding the shim activity to the workflow in response to determining that the custom activity is not associated with a fully-trusted activity assembly.

13. The method of claim 1,
wherein the electronic communications network is a first electronic communications network;
wherein the method further comprises: receiving, at the front-end computing system, a request for a resource, the front-end computing system receiving the request from a client computing system via a second electronic communications network; and
wherein executing the shim activity object comprises initiating, at the front-end computing system, execution of the shim activity object in response to the request.

14. An electronic computing system comprising:
a processing unit; and
a data storage system storing instructions that, when executed by the processing unit, configure the electronic computing system such that the electronic computing system:

initializes a workflow instance, the workflow instance being an instance of a workflow, the workflow comprising a plurality of activities, the plurality of activities including a shim activity, the workflow implementing a business process of an enterprise;

after initializing the workflow instance, starts execution of the workflow instance; and during execution of the workflow instance, executes a shim activity object implementing the shim activity, the shim activity object being an instantiation of a shim activity assembly that is fully-trusted by an administrator of the electronic computing system, execution of the shim activity object causing the electronic computing system to:

automatically send a custom activity assembly to a sandbox computing system via an electronic communications network, the sandbox computing system configured to generate and execute a custom activity object, the custom activity object being an instantiation of the custom activity assembly, the custom activity object implementing a custom activity, the sandbox computing system being isolated from the electronic computing system such that unexpected behavior of the sandbox computing system does not cause the electronic computing system to perform unexpected behavior;

automatically send an initial workflow context object to the sandbox computing system, the initial workflow context object including properties, the sandbox computing system configured to use values of the properties of the initial context object as initial values of properties of the custom activity object;

after sending the custom activity assembly and the initial workflow context object, receive a modified workflow context object from the sandbox computing system, the modified workflow context object including properties having values equivalent to values of properties of the custom activity object;

after receiving the modified workflow context object, update values of properties of the shim activity object based on the values of the properties of the modified context object; and after updating the properties of the shim activity object, complete execution of the shim activity object.

15. The electronic computing system of claim 14, the instructions further configuring the electronic computing system such that the electronic computing system:

displays a user interface of a workflow design application, the user interface containing a representation of the custom activity, the representation of the custom activity identifying the custom activity to a user without displaying implementation details of the custom activity;

receives input from the user, the input indicating that the user has manipulated the representation of the custom activity to indicate that the user wants to include the custom activity in the workflow; and in response to receiving the input, adds the shim activity to the workflow.

16. The electronic computing system of claim 15, wherein the electronic computing system adds the shim activity to the workflow by adding a shim activity element to a plurality of activity elements in a workflow file, each activity element in the plurality of activity elements indicating one of the activities in the workflow, the shim activity element including an attribute specifying the custom activity assembly.

17. The electronic computing system of claim 16, wherein the instructions configure the electronic computing system such that the electronic computing system initializes the workflow instance by:

automatically instantiating a plurality of activity objects, the plurality of activity objects including one activity object for each activity element in the plurality of activity elements in the workflow file; and automatically binding values of properties of activity objects in the plurality of activity objects based on values of attributes of activity elements in the plurality of activity elements in the workflow file.

18. The electronic computing system of claim 14, wherein execution of the shim activity object causes the electronic computing system to send a wrapper class identifier to the sandbox system, the wrapper class identifier identifying a wrapper class installed at the sandbox computing system, the wrapper class configured to deserialize the initial workflow context object and to initiate execution of an instance of the custom activity assembly at the sandbox computing system.

19. The electronic computing system of claim 14, wherein the instructions further configure the electronic computing system such that the electronic computing system starts a runtime environment; and wherein the instructions configure the electronic computing system such that the electronic computing system initializes the workflow instance in the runtime environment.

20. A computer-readable data storage medium comprising instructions that, when executed by a processing unit of an electronic computing system, cause the electronic computing system to:

display, on a display device, a user interface of a workflow design application, the user interface containing representations of available activities, the representations of the available activities identifying the available activities to a user without displaying implementation details of the available activities, the available activities being activities available to be included in a workflow, the available activities including a custom activity, the custom activity associated with a custom activity assembly not shipped with the workflow design application;

receive drag-and-drop input from the user, the drag-and-drop input indicating that the user has manipulated the representation of the custom activity to indicate that the user wants to include the custom activity in the workflow, the workflow implementing a business process of an enterprise;

in response to receiving the drag-and-drop input, add a shim activity element to a plurality of activity elements in a workflow file, each activity element in the plurality of activity elements indicating an activity in the workflow, each activity in the workflow associated with an activity assembly in a plurality of activity assemblies, the shim activity element including an attribute specifying the custom activity assembly, the shim activity associated with a shim activity assembly in the plurality of activity assemblies, the shim activity assembly being fully trusted by an administrator of the electronic computing system, the custom activity assembly not being fully trusted by the administrator of the electronic computing system;

after adding the shim activity element to the plurality of activity elements, compile the workflow file into a compiled workflow file defining the workflow;

automatically add the compiled workflow file and the custom activity assembly to a solution file;

install the solution file at the electronic computing system;
after installing the solution file, start a runtime environment;
after starting the runtime environment, invoke an initialization method of the runtime environment that initializes a workflow instance in the runtime environment, the workflow instance being an instance of the workflow defined by the compiled workflow file, the workflow instance including a plurality of activity objects, each activity object in the plurality of activity objects is an instantiation of an activity assembly in the plurality of activity assemblies, the plurality of activity objects including a shim activity object, the shim activity object being an instance of the shim activity assembly; and
after invoking the initialization method, invoke a start method of the workflow instance, the start method of the workflow instance initiating execution of activity objects in the plurality of activity object in the workflow instance, execution of the shim activity object causing the electronic computing system to:
  automatically send the custom activity assembly to a sandbox computing system via an electronic communications network, the sandbox computing system being isolated from the electronic computing system such that the unexpected behavior of the sandbox computing system does not cause the electronic computing system to perform unexpected behavior;
  automatically send an initial workflow context object to the sandbox computing system via the electronic communications network, the initial workflow context object including input parameters of the custom activity assembly;
  automatically send a wrapper class identifier to the sandbox computing system via the electronic communications network, the wrapper class identifier identifying a wrapper class installed at the sandbox computing system, the wrapper class configured to deserialize the initial workflow context object and the initial workflow context object, the wrapper class configured to initiate execution of an instance of the custom activity assembly using the input parameters included in the initial workflow context object;
  after sending the custom activity assembly, the initial workflow context object and the wrapper class identifier to the sandbox computing system, automatically receive a modified workflow context object from the sandbox computing system, the modified workflow context object including properties having values equivalent to values of properties of the custom activity assembly;
  update values of properties of the shim activity object based on the values of the properties of the modified workflow context object; and
  complete execution of the shim activity object.

* * * * *